United States Patent
Takahashi

(10) Patent No.: US 11,595,562 B2
(45) Date of Patent: Feb. 28, 2023

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventor: Ryotaro Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 195 days.

(21) Appl. No.: 16/838,895

(22) Filed: Apr. 2, 2020

(65) Prior Publication Data

US 2020/0329191 A1 Oct. 15, 2020

(30) Foreign Application Priority Data

Apr. 10, 2019 (JP) .............................. JP2019-074980

(51) Int. Cl.
| | |
|---|---|
| H04N 5/232 | (2006.01) |
| G02B 7/28 | (2021.01) |
| G02B 7/36 | (2021.01) |
| G03B 13/36 | (2021.01) |

(52) U.S. Cl.
CPC ......... *H04N 5/23212* (2013.01); *G02B 7/285* (2013.01); *G02B 7/36* (2013.01); *G03B 13/36* (2013.01)

(58) Field of Classification Search
CPC ................................................ H04N 5/23212
USPC ....................................................... 348/349
See application file for complete search history.

(56) References Cited

U.S. PATENT DOCUMENTS

| | | |
|---|---|---|
| 2010/0033593 A1 | 2/2010 | Sasaki |
| 2012/0237193 A1 | 9/2012 | Kawarada |
| 2014/0071318 A1 | 3/2014 | Akamatsu |
| 2014/0105454 A1* | 4/2014 | Yoneyama ....... H04N 5/232127 382/103 |
| 2017/0054896 A1 | 2/2017 | Sugitani |
| 2017/0208240 A1 | 7/2017 | Kadohara |
| 2017/0374271 A1 | 12/2017 | Takao |

FOREIGN PATENT DOCUMENTS

| | | | |
|---|---|---|---|
| CN | 103685910 A | 3/2014 | |
| CN | 103731604 A | 4/2014 | |
| JP | 09189852 A | 7/1997 | |
| JP | 2007-011054 A | 1/2007 | |
| JP | 2012-226206 A | 11/2012 | |
| JP | 2018-131693 * | 7/2018 | ....... H04N 5/232125 |
| WO | 2014/109125 A1 | 7/2014 | |

* cited by examiner

*Primary Examiner* — Joel W Fosselman
(74) *Attorney, Agent, or Firm* — Canon U.S.A., Inc. IP Division

(57) ABSTRACT

An autofocus (AF) frame integration unit generates at least two groups, each group including at least one focus detection area based on a comparison between a plurality of focus detection results, the plurality of focus detection results to be obtained corresponding to a specific time. A movement determination unit determines whether an object corresponding to a first group and a second group is moving, based on a focus detection result corresponding to the first group, generated based on a focus detection result corresponding to a first time, and a focus detection result corresponding to the second group, generated based on a focus detection result corresponding to a second time later than the first time.

24 Claims, 8 Drawing Sheets

IMAGE PROCESSING APPARATUS, CONTROL METHOD THEREOF, AND STORAGE MEDIUM

BACKGROUND OF THE INVENTION

Field of the Invention

The present invention relates to a subject detection apparatus for detecting an image capturing target, a detection method thereof, and an image processing apparatus.

Description of the Related Art

In recent years, digital cameras include an autofocus (AF) function for controlling the driving of a focus lens to focus a subject in a focus detection area automatically selected by a camera. In addition, a technique for automatically selecting a focus detection area by detecting a main subject as an image capturing target and automatically selecting the focus detection area corresponding to the main subject is known.

WO 2014/109125 discusses a main subject detection method in which a temporal change in distance information about the distance from a camera to a subject is detected for each focus detection area, thereby detecting approaching and receding movements of an object for each focus detection area. Further, when a subject corresponding to the focus detection area is moving, the subject is detected as a main subject.

According to a method discussed in WO 2014/109125, a moving subject is detected as a main subject, to thereby control driving of a focus lens so that the moving subject is focused.

However, the method discussed in WO 2014/109125 has a problem that a motion of an object in a focus detection area cannot be accurately detected in some cases as described below. For example, a focus detection area near an outline of a subject can include the subject and a background at the same time. In such a case, the reliability of distance information detected from the focus detection area is low and the accuracy of determining a moving object based on the distance information deteriorates. Further, for example, a stationary portion, such as the background, can be determined to be a moving object due to an error in focus detection. In addition, for example, in imaging plane phase difference focus detection, an error can occur in a focus detection result detected from a portion that is not focused, which can lead to a deterioration in the accuracy of determining a moving object using the distance information based on the focus detection result. In a case where a motion of an object cannot be accurately detected, for example, for the reason described above, if a stationary subject is erroneously detected as a moving subject, driving of the focus lens is controlled to focus the subject that is not actually moving.

Accordingly, the present exemplary embodiment is directed to providing an image processing apparatus capable of accurately detecting a moving object even in a situation where the accuracy of focus detection can deteriorate, a control method thereof, and a storage medium.

SUMMARY OF THE INVENTION

According to an aspect of the present invention, an image processing apparatus includes a focus detection unit configured to obtain a focus detection result from each of a plurality of focus detection areas, each focus detection result to be obtained corresponding to a specific time, a grouping unit configured to generate at least two groups, each group including at least one focus detection area based on a comparison between a plurality of obtained focus detection results, and a movement determination unit configured to determine a movement of an object corresponding to a group generated by the grouping unit based on a focus detection result corresponding to the group. The movement determination unit is configured to determine whether an object corresponding to a first group and a second group is moving, based on a focus detection result corresponding to the first group, generated based on a focus detection result corresponding to a first time, and a focus detection result corresponding to the second group, generated based on a focus detection result corresponding to a second time, the second time being later than the first time.

Further features of the present invention will become apparent from the following description of exemplary embodiments with reference to the attached drawings.

DESCRIPTION OF THE EMBODIMENTS

Preferred exemplary embodiments of the present invention will be described below with reference to the accompanying drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

<Configuration of Image Capturing System>

Figure 1:
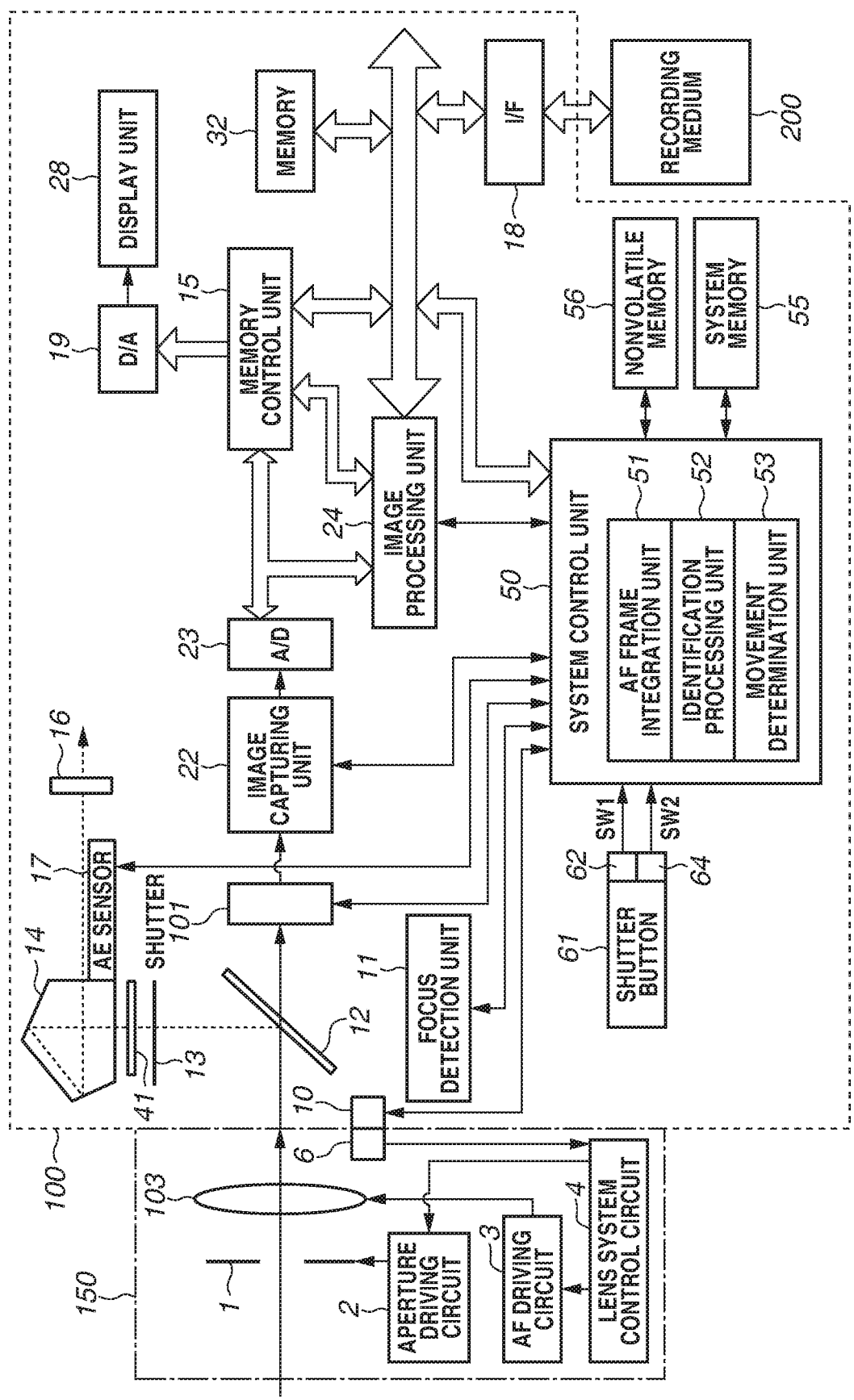
FIG. 1 is a block diagram illustrating a configuration example of a digital camera according to an exemplary embodiment of the present invention.

FIG. 1 is a block diagram illustrating a configuration example of a digital camera 100 according to an exemplary embodiment of the present invention. The present exemplary embodiment illustrates an example where a lens-interchangeable image capturing system is used. However, the digital camera 100 may include a fixed lens. Further, an image processing apparatus, such as a personal computer (PC), may be used, and information corresponding to an image signal to be obtained by the digital camera 100 may be obtained from an external apparatus.

Referring to FIG. 1, a lens unit 150 is a lens unit having an interchangeable image capturing lens mounted thereon.

The lens unit 150 includes a lens group consisting of a plurality of lenses. In this case, however, the illustration of the lens unit 150 is simplified and only a focus lens 103 is illustrated. A communication terminal 6 is a communication terminal used for the lens unit 150 to communicate with the digital camera 100. A communication terminal 10 is a communication terminal used for the digital camera 100 to communicate with the lens unit 150. The lens unit 150 communicates with a system control unit 50 via the communication terminals 6 and 10, and causes a lens system control circuit 4 included in the lens unit 150 to control an aperture 1 through an aperture driving circuit 2. Further, the lens unit 150 communicates with the system control unit 50 via the communication terminals 6 and 10 and displaces the position of the focus lens 103 through an autofocus (AF) driving circuit 3, thereby performing a focusing operation.

An automatic exposure (AE) sensor 17 measures the brightness of a subject through the lens unit 150.

A focus detection unit 11 includes a dedicated sensor (not illustrated) for phase difference focus detection. The focus detection unit 11 photoelectrically converts light received through a known secondary imaging optical system by using the dedicated sensor, and executes the phase difference focus detection based on an output parallax signal. In the phase difference focus detection, an image shift amount is calculated based on the parallax signal and a defocus amount is calculated based on the image shift amount. The focus detection unit 11 outputs the defocus amount obtained through the phase difference focus detection to the system control unit 50. The system control unit 50 controls the lens unit 150 based on the defocus amount.

A quick return mirror 12 (hereinafter referred to as the mirror 12) is raised and lowered by an actuator (not illustrated) in response to an instruction from the system control unit 50 during exposure, live view image capturing, and moving image capturing. The mirror 12 is a mirror for switching a light beam entering from the lens group, including the focus lens 103, between a finder 16 and an image capturing unit 22. The mirror 12 is normally disposed to guide the light beam to the finder 16 so that the light beam is reflected. In the case of image capturing or live view display, the mirror 12 is flipped upward to guide the light beam to the image capturing unit 22 and is retracted from the inside of the light beam (mirror up). The mirror 12 is configured as a half mirror that causes the light beam to be partially transmitted through a central portion of the mirror 12, and the mirror 12 causes a part of the light beam to be transmitted and incident on the focus detection unit 11 for performing focus detection.

By observing a focusing screen 13 via a pentaprism 14 and the finder 16, a photographer can check a focus and a composition of an optical image of a subject obtained by the lens unit 150.

A shutter 101 is a focal-plane shutter capable of freely controlling an exposure time of the image capturing unit 22 under control of the system control unit 50.

The image capturing unit 22 is an image sensor including, for example, a charge-coupled device (CCD) or a complementary metal oxide semiconductor (CMOS) device, which converts an optical image into an electrical signal. An analog-to-digital (A/D) converter 23 converts an analog signal into a digital signal. The A/D converter 23 is used to convert an analog signal output from the image capturing unit 22 into a digital signal.

An image processing unit 24 performs resize processing such as predetermined pixel interpolation and reduction, and color conversion processing on data supplied from the A/D converter 23 or data supplied from a memory control unit 15. Further, the image processing unit 24 performs predetermined arithmetic processing, including focus detection, using captured image data, and the system control unit 50 performs exposure control and focus adjustment control based on the obtained arithmetic processing result. Thus, through-the-lens (TTL) AF processing, AE processing, and flash preliminary emission (EF) processing are carried out. Further, the image processing unit 24 performs predetermined arithmetic processing using captured image data, and also performs TTL automatic white balance (AWB) processing based on the obtained arithmetic processing result.

The focus detection control to be executed by the image processing unit 24 will now be described in more detail. In the present exemplary embodiment, the image processing unit 24 is capable of performing known imaging plane phase difference focus detection. Specifically, the image capturing unit 22 is capable of obtaining a parallax signal by providing focus detection pixels, which can be pupil-divided on the image sensor, in all or some of the pixels. The system control unit 50 executes phase difference focus detection based on the parallax signal obtained from the image sensor of the image capturing unit 22, thereby calculating a defocus amount. The image processing unit 24 outputs the defocus amount obtained through the phase difference focus detection to the system control unit 50. The system control unit 50 controls the lens unit 150 based on the focus amount.

A part or the entirety of the phase difference focus detection to be executed by the focus detection unit 11 or the image processing unit 24 may be executed by the system control unit 20. Further, the focus detection unit 11 or the image processing unit 24 may execute processing for calculating a lens driving amount for controlling the lens unit 150 based on the defocus amount and may output the lens driving amount to the system control unit 50. Alternatively, the system control unit 50 may execute the calculation processing.

A nonvolatile memory 56 is an electrically erasable/recordable memory. For example, an electrically erasable programmable read-only memory (EEPROM) is used as the nonvolatile memory 56. The nonvolatile memory 56 stores constants, programs, and the like used for operation of the system control unit 50. The programs described herein refer to programs for executing various processing in flowcharts to be described below according to the present exemplary embodiment.

The system control unit 50 is a control unit including at least one processor, and controls the overall operation of the digital camera 100. The system control unit 50 includes an AF frame integration unit 51, an identification processing unit 52, and a movement determination unit 53. The system control unit 50 executes the programs recorded on the nonvolatile memory 56 described above, thereby implementing each process according to the present exemplary embodiment as described below. As a system memory 55, a random-access memory (RAM) is used. Constants and variables used for operation of the system control unit 50, programs read from the nonvolatile memory 56, and the like are loaded into the system memory 55. Further, the system control unit 50 performs display control by controlling a memory 32, a digital-to-analog (D/A) converter 19, a display unit 28, and the like.

The AF frame integration unit 51 (which is also referred to as a grouping unit) generates groups by integrating AF frames (each of which is also referred to as a focus detection area) based on the defocus amount obtained from the focus detection unit 11. Further, the AF frame integration unit 51 calculates a representative defocus amount corresponding to each group obtained by integrating AF frames. The calculated representative defocus amount is stored in the system memory 55. The AF frame integration unit 51 continuously performs processing during image capturing by the digital camera 100.

The identification processing unit 52 performs processing for associating the representative defocus amount in the latest group calculated by the AF frame integration unit 51 and the representative defocus amount in the previous group stored in the system memory 55. A temporal change in each representative defocus amount obtained as a result of associating the representative defocus amounts is stored in the system memory 55.

The movement determination unit 53 detects a moving object based on the memory of the temporal change in each representative defocus amount in the system memory 55. The system control unit 50 selects an exposure control target and a ranging control target based on the moving object detected by the movement determination unit 53. The movement determination unit 53 is also referred to as a movement determination unit.

<Overall Moving Object Detection Processing Flow>

Figure 4:
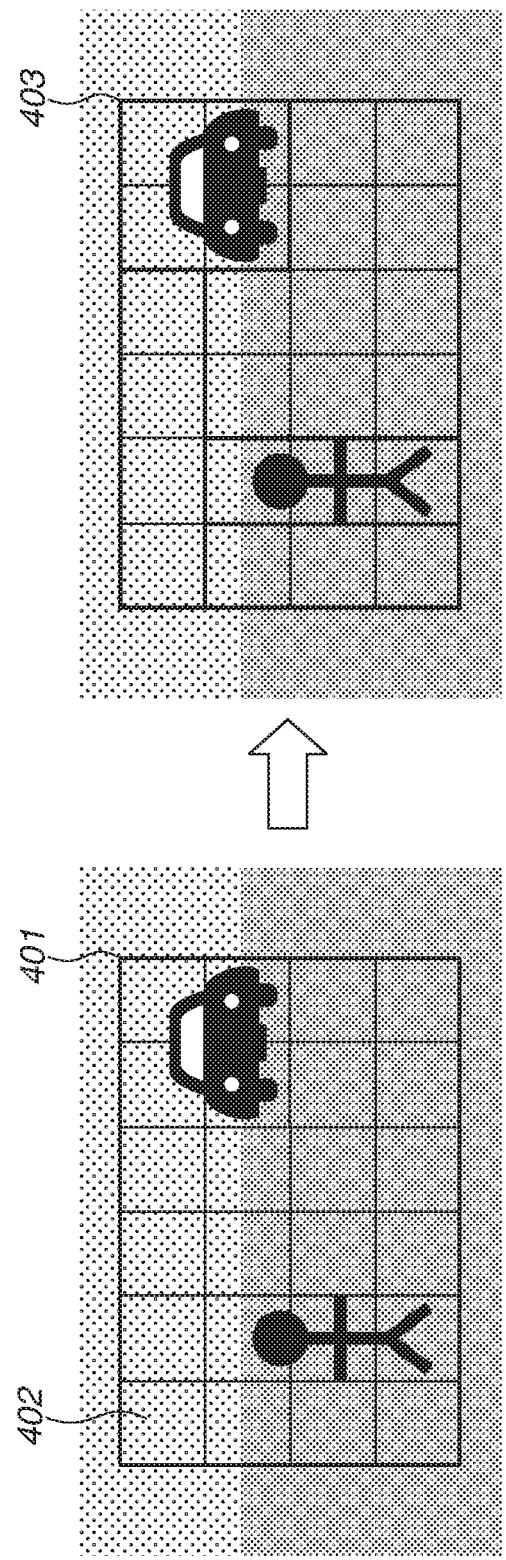
FIG. 4 is an explanatory diagram illustrating AF frame integration processing according to the first exemplary embodiment.

An overall moving object detection processing flow to be executed in the first exemplary embodiment of the present invention will be described with reference to a flowchart illustrated in FIG. 2 and an explanatory diagram illustrated in FIG. 4.

Figure 2:
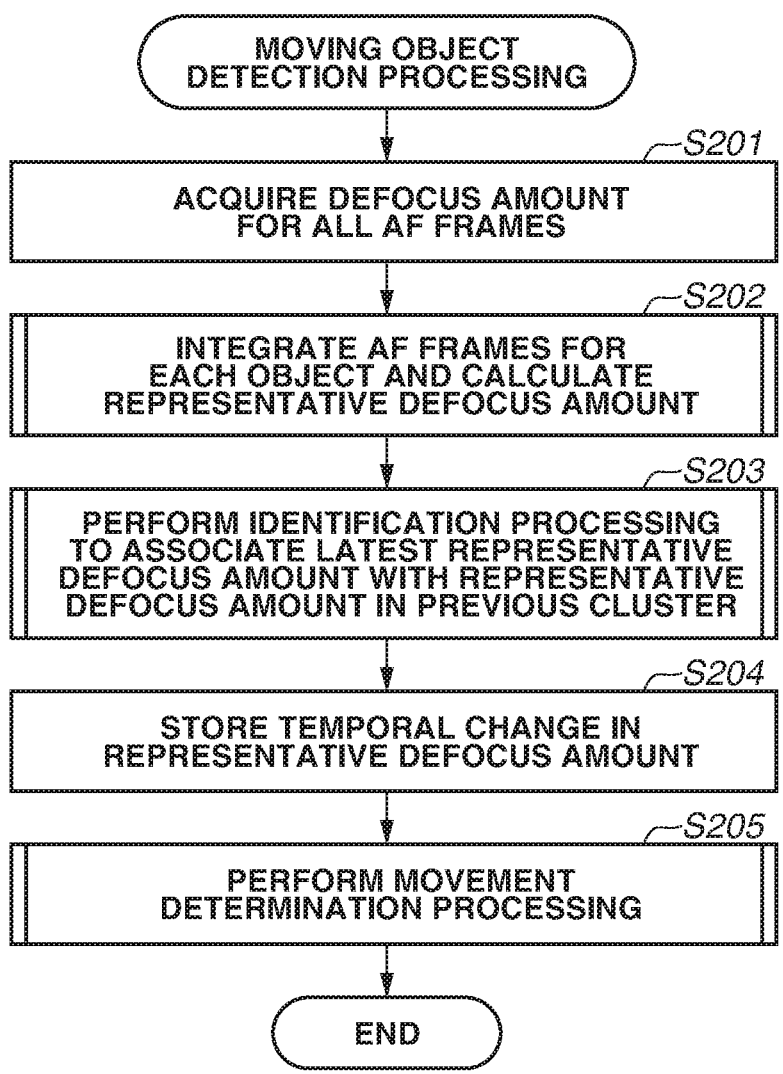
FIG. 2 is a flowchart illustrating moving object detection processing according to a first exemplary embodiment.

First, in step S201 illustrated in FIG. 2, the system control unit 50 obtains the defocus amount obtained from the focus detection unit 11 or the image processing unit 24 for all AF frames. Each AF frame is an area partitioned in a lattice shape, for example, as indicated by an area 401 illustrated in FIG. 4. In this case, the focus detection unit 11 or the image processing unit 24 obtains the defocus amount from each AF frame based on an image signal obtained from the focus detection unit 11 or the image capturing unit 22 at a specific time. Specifically, in step S201, a plurality of focus detection results corresponding to the specific time is obtained.

Next, in step S202, the AF frame integration unit 51 performs integration processing for integrating AF frames based on the defocus amount obtained in step S201. As a result, the AF frame can be partitioned for each object in the composition as indicated by an area 403 illustrated in FIG. 4. The integration processing will be described in detail below. A group including at least one AF frame is hereinafter referred to also as a "cluster".

In step S202, the system control unit 50 calculates a representative value for the focus detection result for each of the generated clusters. In the present exemplary embodiment, for example, a representative defocus amount is calculated as a representative value. In the present exemplary embodiment, an average value of defocus amounts of AF frames included in each cluster is calculated as the representative defocus amount. The method for calculating the representative defocus amount is not limited to this example, as long as the representative value for the focus detection result in each cluster can be obtained. For example, if a plurality of defocus amounts can be detected from AF frames included in each cluster, a median or mode value of the plurality of defocus amounts may be used. In addition, a defocus amount of an AF frame around the center of a cluster may be used as the representative value.

Since a series of processes illustrated in FIG. 2 are repeatedly performed during image capturing by the digital camera 100, the representative defocus amounts calculated in step S201 are successively stored in the system memory 55. Each representative defocus amount stored in the system memory 55 prior to the preceding step S201 is hereinafter referred to as a representative defocus amount in the previous cluster.

In step S203, the identification processing unit 52 performs processing for associating the latest representative defocus amount stored in the system memory 55 by the AF frame integration unit 51 with the representative defocus amount in the previous cluster that is previously stored in the system memory 55. The identification processing will be described in detail below.

In step S204, the system control unit 50 stores a temporal change in the representative defocus amount in all clusters associated by the identification processing unit 52 in the system memory 55.

In step S205, the movement determination unit 53 calculates a consistency of a moving speed and a movement direction of each cluster based on the memory of the temporal change in the representative defocus amount in the system memory 55, and determines whether each cluster is moving. The movement determination processing will be described in detail below.

<AF Frame Integration Processing>

The AF frame integration processing (step S202) in the flowchart illustrated in FIG. 2 will now be described in detail with reference to a flowchart illustrated in FIG. 3 and the explanatory diagram illustrated in FIG. 4.

Figure 3:
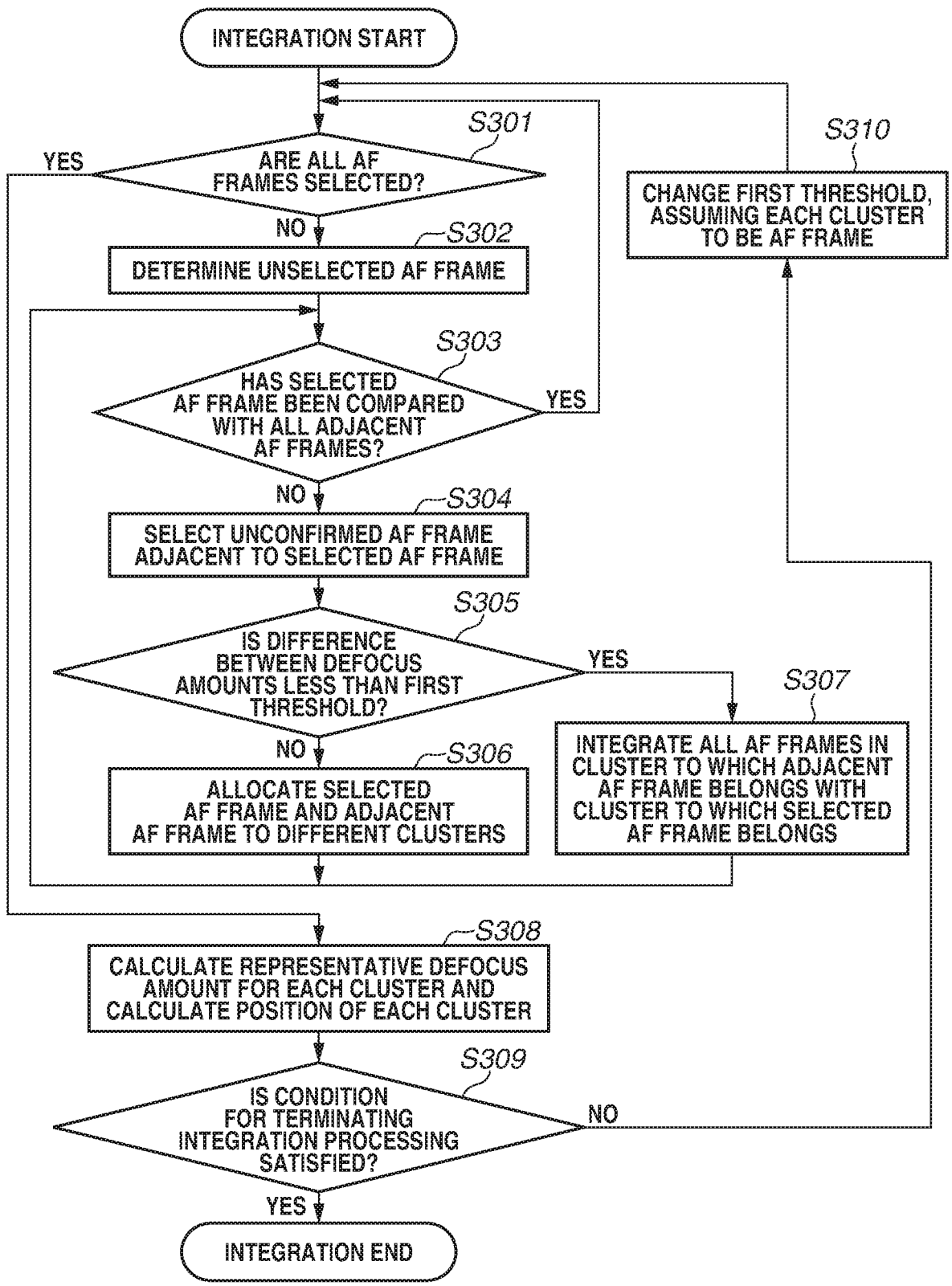
FIG. 3 is a flowchart illustrating autofocus (AF) frame integration processing according to the first exemplary embodiment.

In step S301 illustrated in FIG. 3, the system control unit 50 determines whether all AF frames are selected. If all AF frames are selected (YES in step S301), the processing proceeds to step S308. If there is any unselected AF frame (NO in step S301), the processing proceeds to step S302.

In step S302, the system control unit 50 selects one AF frame from among all the AF frames. For example, an AF frame 402 illustrated in FIG. 4 is selected from among all the AF frames in the area 401 illustrated in FIG. 4. The AF frame selected in this case is hereinafter referred to also as a first AF frame.

In step S303, the system control unit 50 determines whether all AF frames adjacent to the first AF frame have been compared with the first AF frame. If all the adjacent AF frames have been compared (YES in step S303), the processing proceeds to step S301. If there is any AF frame that has not been compared with the first AF frame (NO in step S303), the processing proceeds to step S304.

In step S304, the system control unit 50 selects one AF frame, which has not been compared yet, from among all the AF frames adjacent to the first AF frame. The AF frame selected as an AF frame to be compared with the first AF frame is hereinafter also referred to as a second AF frame.

In step S305, the system control unit 50 calculates a difference between the defocus amount of the first AF frame and the defocus amount of the second AF frame. If the difference between the defocus amounts is less than a predetermined first threshold (YES in step S305), the processing proceeds to step S307. If the difference is more than or equal to the first threshold (NO in step S305), the processing proceeds to step S306.

A level of granularity at which the AF frames are to be integrated into a cluster by the AF frame integration processing is determined depending on the magnitude of the first threshold. If the first threshold is a small value, a larger number of smaller clusters composed of a smaller number of AF frames are generated, as compared with a case where the first threshold is a larger value. If the first threshold is a large value, a smaller number of larger clusters composed of a larger number of AF frames are generated, as compared with a case where the first threshold is a smaller value. In addition, the first threshold may be set depending on a lens focal length or image capturing distance during image capturing. For example, in the case of the image capturing distance, the first threshold is decreased when the image capturing distance is long, and the first threshold is increased when the image capturing distance is short. For example, when the focal length is short, the first threshold is set to a small value, and when the focal length is long, the first threshold is set to a large value. As a result, clusters with the same granularity can be generated even when the lens focal length is changed.

In step S306, the system control unit 50 allocates the first AF frame and the second AF frame to different clusters. However, if the first and second AF frames are already integrated into the same cluster, the allocation processing is not carried out. In this case, if the first AF frame or the second AF frame does not belong to any cluster, a new cluster corresponding to the AF frame that does not belong to any cluster is generated and the AF frame is allocated to the generated cluster.

In step S307, the system control unit 50 integrates all AF frames, including the second AF frame, in the cluster to which the second AF frame belongs with the cluster to which the first AF frame belongs.

In step S308, the system control unit 50 calculates the representative value for the focus detection result for each of the generated clusters. As described above, in the present exemplary embodiment, for example, the representative defocus amount is calculated as the representative value. The representative defocus amount is calculated for each of the clusters from the defocus amounts of AF frames belonging to each cluster. In the present exemplary embodiment, the system control unit 50 calculates the representative defocus amount by calculating the average value of the defocus amounts of the AF frames belonging to each cluster. As described above, the method for calculating the representative value for the focus detection result in each cluster is not limited to this example. For example, if a plurality of defocus amounts can be detected from the AF frames included in each cluster, a median or mode value of the plurality of defocus amounts may be used. Alternatively, a defocus amount of an AF frame around the center of a cluster may be used as the representative value.

In step S308, the system control unit 50 calculates the position of each cluster. In the present exemplary embodiment, for example, an average value of positions of AF frames, which constitute a cluster, on a sensor is calculated, and the calculated average value is used as the position of the cluster. The method for calculating the position of each cluster is not limited to this example, as long as the value corresponding to the position of each cluster can be obtained.

In step S309, the system control unit 50 determines whether the current cluster state satisfies a condition for terminating the integration processing. In the present exemplary embodiment, a condition in which the first threshold used for integration processing is more than or equal to a second threshold is set as the condition for terminating the integration processing. For example, by setting 1 fδ as the second threshold, while subjects having in-focus states in an equivalent range of depth of focus are deemed as the same subject, subjects located at positions apart from each other by that range of depth of focus or more are not integrated into the same cluster. If the first threshold is more than or equal to the second threshold (YES in step S309), it is determined that the condition for terminating the integration processing is satisfied, and then the integration processing is terminated. If the first threshold is less than the second threshold (NO in step S309), the processing proceeds to step S310.

In this case, if the above-described lens group includes a zoom lens, the magnitude of the second threshold, which is set as the condition for terminating the integration processing, may be changed depending on the current focal length. More specifically, the second threshold, which is set as the condition for terminating the integration processing, may be decreased as the focal length increases. This is because, as compared with a case where a first focal length is set, if a second focal length that is greater than the first focal length is set, the difference in absolute distance is greater for the difference of 1 fδ.

Other conditions may be used as the condition for terminating the integration processing. For example, the magnitude of variance of the representative defocus amount in each cluster may be used. If the variance of the representative defocus amount in each cluster is sufficiently large, it is highly likely that the clusters are different subjects. Accordingly, the integration processing is terminated.

In step S310, the system control unit 50 newly sets the first threshold to be used in step S305. The first threshold set at this time is desirably sufficiently greater than the first threshold used in step S305 in the previous integration processing.

After completion of step S310, the system control unit 50 performs integration processing for the clusters, instead of integration processing for the AF frames, by using the position of each cluster and the representative defocus amount. In other words, after the cluster generation processing, processing similar to the integration processing performed on each AF frame is performed for each cluster, assuming that each cluster is an AF frame. In this manner, the integration processing is repeatedly executed until it is determined that the condition for terminating the integration processing is satisfied in step S309.

An advantageous effect of changing the threshold will now be described. AF frames can be more easily integrated as the first threshold increases. However, for example, a plurality of objects may be cut out as a single cluster in some cases. Therefore, in the present exemplary embodiment, the processing is repeated by changing the first threshold, which is set as an initial value, such that the first threshold increases in step S310 from a value smaller than the first threshold corresponding to the degree of integration to be finally obtained. As a result, the integration processing result suitable for the degree of integration to be finally obtained is obtained. With this configuration, for example, even in a scene in which far and near AF frames in one frame are integrated into the same cluster if the integration processing is started from the first threshold corresponding to the degree of integration to be finally obtained, the AF frames can be integrated into different clusters.

<Identification Processing>

The identification processing (step S203) in the flowchart illustrated in FIG. 2 will now be described in detail with reference to a flowchart illustrated in FIG. 5. The moving object detection processing illustrated in FIG. 2 is actually continuously performed. Accordingly, a temporal change in the representative defocus amount is already stored in the system memory 55 during the previous moving object detection processing. The latest cluster group obtained in the AF frame integration processing is hereinafter referred to as a current cluster group, and the previous cluster group associated with the memory of the temporal change in the representative defocus amount generated in the previous moving object detection processing is hereinafter referred to as a previous cluster group. Each cluster included in the previous cluster group is a cluster generated based on an image signal obtained from the focus detection unit 11 or the image capturing unit 22 at a first time and based on a plurality of focus detection results obtained by the focus detection unit 11 or the image processing unit 24. Each cluster included in the current cluster group is a cluster generated based on an image signal obtained from the focus detection unit 11 or the image capturing unit 22 at a second time, which is later than the first time, and based on a plurality of focus detection results obtained by the focus detection unit 11 or the image processing unit 24.

Figure 5:
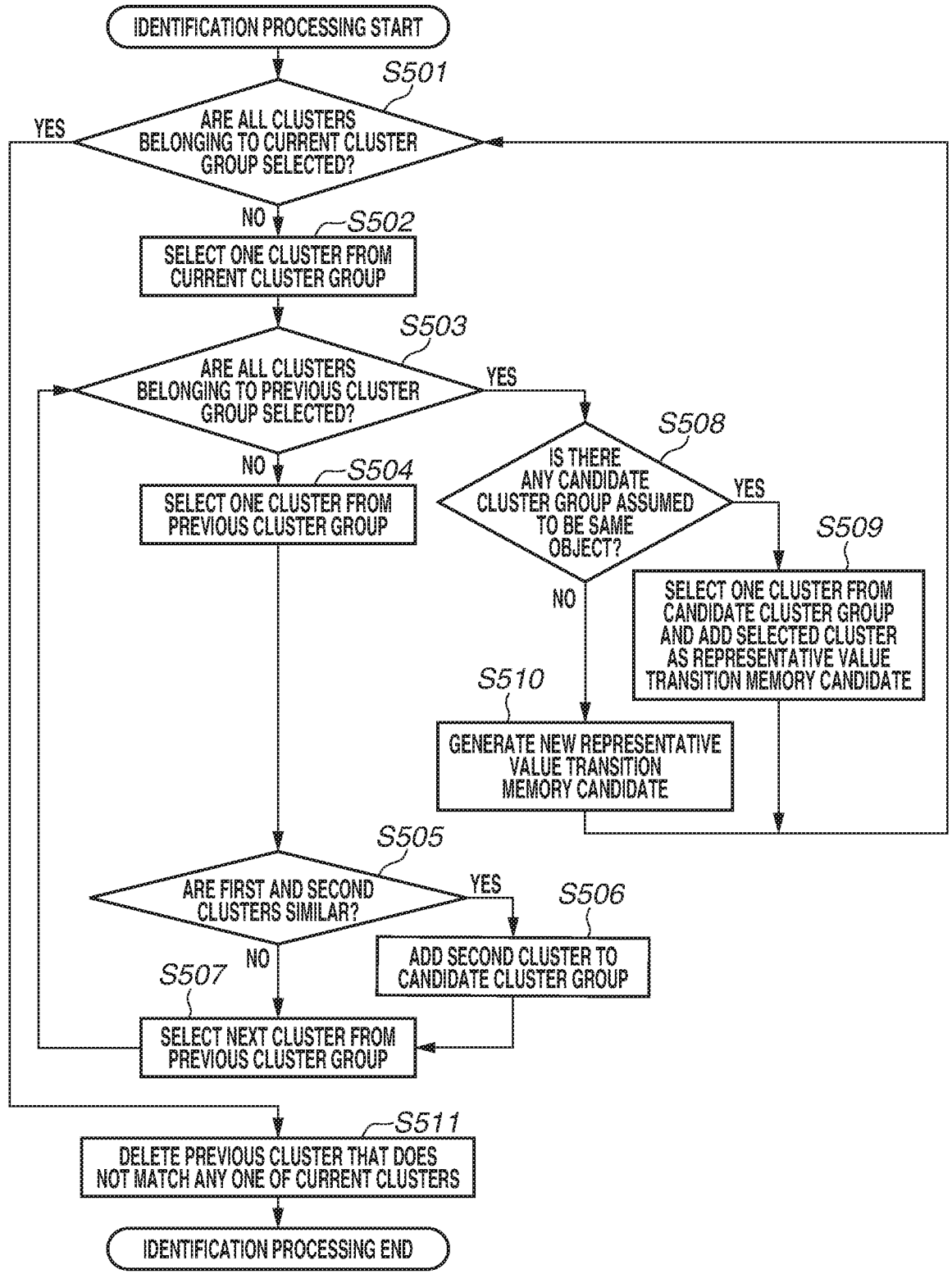
FIG. 5 is a flowchart illustrating identification processing according to the first exemplary embodiment.

In step S501 illustrated in FIG. 5, the system control unit 50 determines whether all clusters belonging to the current cluster group are selected. If all the clusters are selected (YES in step S501), the processing proceeds to step S511. If there is any unselected cluster (NO in step S501), the processing proceeds to step S502.

In step S502, the system control unit 50 selects one cluster from the current cluster group. The selected cluster is hereinafter referred to as a first cluster. The first cluster is also referred to as a first group.

In this case, if the number of AF frames constituting the first cluster is less than a threshold, the first cluster may be deleted from the current cluster group and a new first cluster may be selected. It is less likely that each of clusters in which the number of AF frames is less than the threshold corresponds to a subject. Accordingly, it is expected that the detection ratio can be improved and erroneous detection can be reduced by excluding such clusters from the subsequent processing.

In step S503, the system control unit 50 determines whether all clusters belonging to the previous cluster group are selected. If all the clusters are selected (YES in step S503), the processing proceeds to step S508. If there is any unselected cluster (NO in step S503), the processing proceeds to step S504.

In step S504, the system control unit 50 selects one cluster from the previous cluster group. The selected cluster is hereinafter referred to as a second cluster.

In step S505, the system control unit 50 determines whether the first cluster and the second cluster are similar. If it is determined that the first cluster and the second cluster are similar (YES in step S505), the processing proceeds to step S506. If it is determined that the first cluster and the second cluster are not similar (NO in step S505), the processing proceeds to step S507. In the present exemplary embodiment, the similarity between clusters is determined such that the clusters are sufficiently similar if the difference between the positions of the clusters, the difference between the representative defocus amounts of the clusters, and the difference between the numbers of AF frames constituting the clusters are each less than a threshold. The method for determining the similarity between clusters is not limited to this example, as long as it can be determined whether the first cluster is similar to the second cluster, or whether the first and second clusters indicate the corresponding subject. For example, other feature amounts and calculation methods may be used for determining the similarity between clusters.

In step S506, the system control unit 50 adds the second cluster to a candidate cluster group. The candidate cluster group temporarily stores the cluster that is assumed to be the same object as the first cluster.

In step S507, the system control unit 50 selects, from the previous cluster group, a cluster that has not been compared with the first cluster, and sets the selected cluster as a new second cluster.

In step S508, the system control unit 50 determines whether there is any candidate cluster group that is assumed to be the same object as the current first cluster. If there is any candidate cluster that is assumed to be the same object as the current first cluster (YES in step S508), the processing proceeds to step S509. If there is no candidate cluster that is assumed to be the same object as the current first cluster (NO in step S508), the processing proceeds to step S510.

In step S509, the system control unit 50 selects a cluster that is most similar to the first cluster from the candidate cluster group, and associates the memory of the temporal change in the representative defocus amount associated with the previous cluster with the first cluster again. The present exemplary embodiment illustrates a configuration in which one cluster similar to the first cluster is selected. However, a plurality of clusters similar to the first cluster may be selected. The cluster selected as the cluster that is most similar to the first cluster in the candidate cluster group is also referred to as a second group.

In step S510, the system control unit 50 generates another memory of the temporal change in the representative defocus amount and associates the memory with the first cluster. Specifically, the representative defocus amount corresponding to the cluster selected in step S509 and the time corresponding to the representative defocus amount are stored by associating the representative defocus amount and the time with the first cluster.

In step S511, the system control unit 50 deletes the previous cluster group that does not match any one of the current clusters in step S509. The previous cluster that has been stored in the system memory 55 for a period of time less than a threshold is not deleted and the previous cluster is also treated as a part of the previous cluster group in the subsequent moving object detection processing.

<Movement Determination Processing>

The movement determination processing (step S205) in the flowchart illustrated in FIG. 2 will now be described in detail with reference to a flowchart illustrated in FIG. 6.

Figure 6:
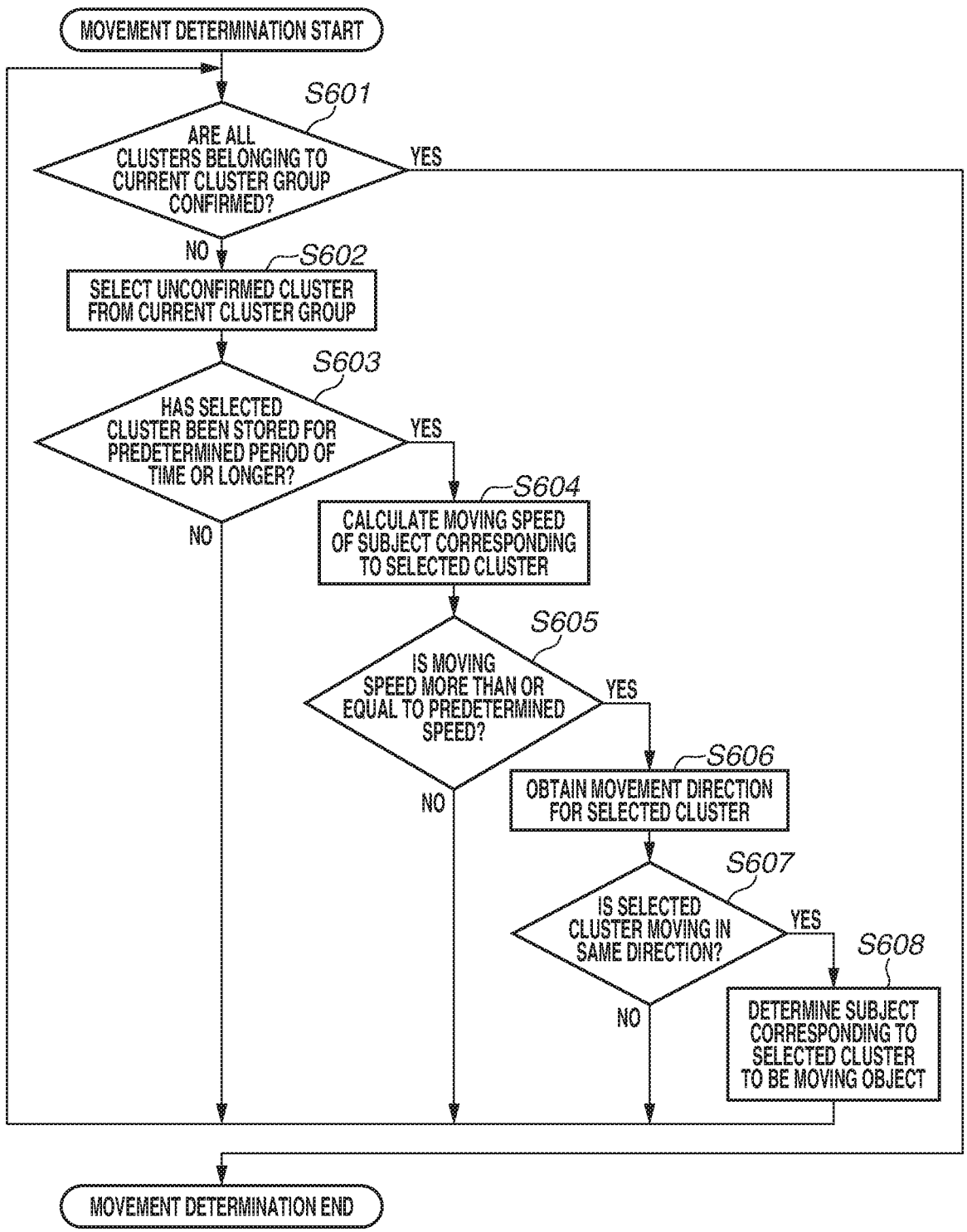
FIG. 6 is a flowchart illustrating movement determination processing according to the first exemplary embodiment.

In step S601 illustrated in FIG. 6, the system control unit 50 determines whether all clusters belonging to the current cluster group are confirmed. If all the clusters are confirmed (YES in step S601), the movement determination processing is terminated. If there is any unconfirmed cluster (NO in step S601), the processing proceeds to step S602.

In step S602 illustrated in FIG. 6, the system control unit 50 selects one unconfirmed cluster from the current cluster group associated with the memory of the temporal change in the representative defocus amount. In step S603, the system control unit 50 determines whether the memory of the temporal change in the representative defocus amount of the cluster selected in step S602 has lasted for a predetermined period of time or longer. If the temporal change in the representative defocus amount of the selected cluster has lasted for the predetermined period of time or longer (YES in step S603), the processing proceeds to step S604. If the memory of the temporal change in the representative defocus amount of the selected cluster has not lasted for the predetermined period of time or longer (NO in step S603), the processing returns to step S601. The present exemplary embodiment illustrates an example where it is determined that the memory of the temporal change in the representative defocus amount of the selected cluster has lasted for the predetermined period of time or longer if the predetermined period of time or more has elapsed from the time when the cluster associated with the selected cluster is generated. The method for determining whether the memory of the temporal change in the representative defocus amount has lasted for the predetermined period of time or longer is not limited to this example, as long as a sufficiently large number of temporal changes in the representative defocus amount can be accumulated. For example, if a predetermined number or more of detected defocus amounts corresponding to the associated clusters are accumulated, it may be determined that the memory of the temporal change in the representative defocus amount has lasted for the predetermined period of time or longer.

In step S604, the system control unit 50 calculates the moving speed of the subject corresponding to the selected cluster. In the present exemplary embodiment, a simple regression analysis is performed on the memory of the temporal change in the representative defocus amount of the selected cluster to obtain a regression coefficient, and the regression coefficient is used as the moving speed of the cluster. The moving speed calculation method is not limited to this example, as long as the moving speed of the subject corresponding to the selected cluster can be calculated. For example, the moving speed of the subject may be calculated by dividing a movement amount of the representative defocus amount by the time corresponding to the movement amount. Alternatively, as the moving speed of the subject corresponding to the selected cluster, an image plane moving speed, which is a moving speed of an image plane position where the subject is focused, may be obtained, or an absolute speed of the subject may be obtained.

In step S605, the system control unit 50 determines whether the moving speed calculated in step S604 is more than or equal to a predetermined speed. If the moving speed is more than or equal to the predetermined speed (YES in step S605), the processing proceeds to step S606. If the moving speed is less than the predetermined speed (NO in step S605), the processing returns to step S601.

In step S606, the system control unit 50 obtains a movement direction per unit time of memory of the temporal change in the representative defocus amount of the selected cluster. Two types of movement directions, i.e., an approaching direction and a receding direction, are detected, and the number of movements in the approaching direction and the number of movements in the receding direction are obtained.

In step S607, the system control unit 50 determines whether the selected cluster is moving in the same direction based on the number of movements in the approaching direction and the number of movements in the receding direction obtained in step S606. In the present exemplary embodiment, the ratio of movements in the same direction during the period of time in which the temporal change in the representative defocus amount of the selected cluster is stored is obtained, and it is determined whether the ratio is more than or equal to a predetermined ratio. If the ratio is more than or equal to the predetermined value (YES in step S607), the processing proceeds to step S608. If the ratio is less than the predetermined value (NO in step S607), the processing returns to step S601. This determination is made because, if the reliability of AF frames constituting the cluster is low and an erroneous ranging result is returned, an error appears in both the approaching direction and the receding direction. In other words, if an erroneous ranging result shows that an object is moving, it is estimated that movements in the approaching direction and the receding direction will appear randomly. Thus it is considered that a cluster which presents a low ratio of movements in the same direction is inappropriate. The present exemplary embodiment illustrates an example where it is determined whether the selected cluster is moving in the same direction based on the ratio of movements in the same direction. However, in practice, the determination method is not limited to this example. For example, the determination may be made based on the ratio of continuous movements in the same direction.

In step S608, the system control unit 50 determines that the subject corresponding to the selected cluster is a moving object.

As described above, in the present exemplary embodiment, the integration processing is performed on the obtained AF frames to reduce adverse effects of erroneous defocus amounts, and a temporal change in the defocus amount of the same object is extracted by identification processing to reduce erroneous detection, thereby making it possible to more accurately detect a moving object.

An overall moving object detection processing flow to be executed according to a second exemplary embodiment of the present invention will be described below with reference to a flowchart illustrated in FIG. 7. The second exemplary embodiment differs from the first exemplary embodiment in that the identification processing unit does not associate the processing with a specific time after the integration of AF frames and the memory of a temporal change in all possible representative defocus amounts is held and then the memory of the temporal change in the representative defocus amounts is evaluated again at the timing of movement determination processing. Descriptions of components of the second exemplary embodiment that are identical to those of the first exemplary embodiment are omitted, and only differences from the first exemplary embodiment will be mainly described below.

In steps S201 and S202, processing similar to that described above in the first exemplary embodiment is carried out.

Figure 7:
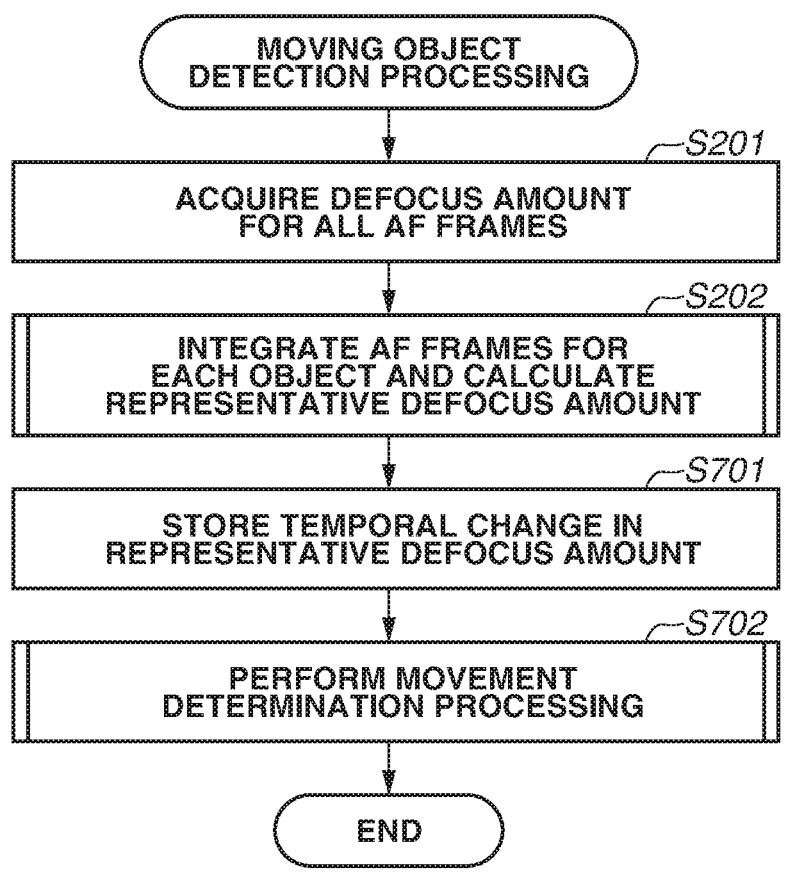
FIG. 7 is a flowchart illustrating moving object detection processing according to a second exemplary embodiment.

In step S701 illustrated in FIG. 7, the system control unit 50 generates memory of a temporal change in the representative defocus amount for each current cluster generated in step S202. Unlike in the first exemplary embodiment, all previous clusters are individually associated with each other and a memory of a temporal change in a plurality of representative defocus amounts is generated for each current cluster, instead of generating the memory of a temporal change in one representative defocus amount for each current cluster. The generated memory of the temporal change in the representative defocus amount is stored in the system memory 55.

In step S702, the movement determination unit 53 determines whether the motion of each cluster is valid, in addition to calculating the frequency of change in the moving speed and movement direction of each cluster based on the memory of the temporal change in the representative defocus amount in the system memory 55. The movement determination processing will be described in detail below.

<Movement Determination Processing>

The movement determination processing (step S702) in the flowchart illustrated in FIG. 7 will now be described in detail with reference to a flowchart illustrated in FIG. 8.

In steps S601 to S607, processing similar to that of the first exemplary embodiment is carried out, and thus the descriptions thereof are herein omitted. If the ratio of movements in the same direction during the period of time in which the temporal change in the representative defocus amount of the selected cluster is stored exceeds a threshold in step S607 (YES in step S607), the processing proceeds to step S801. If the ratio does not exceed the threshold (NO in step S607), the processing returns to step S601.

Figure 8:
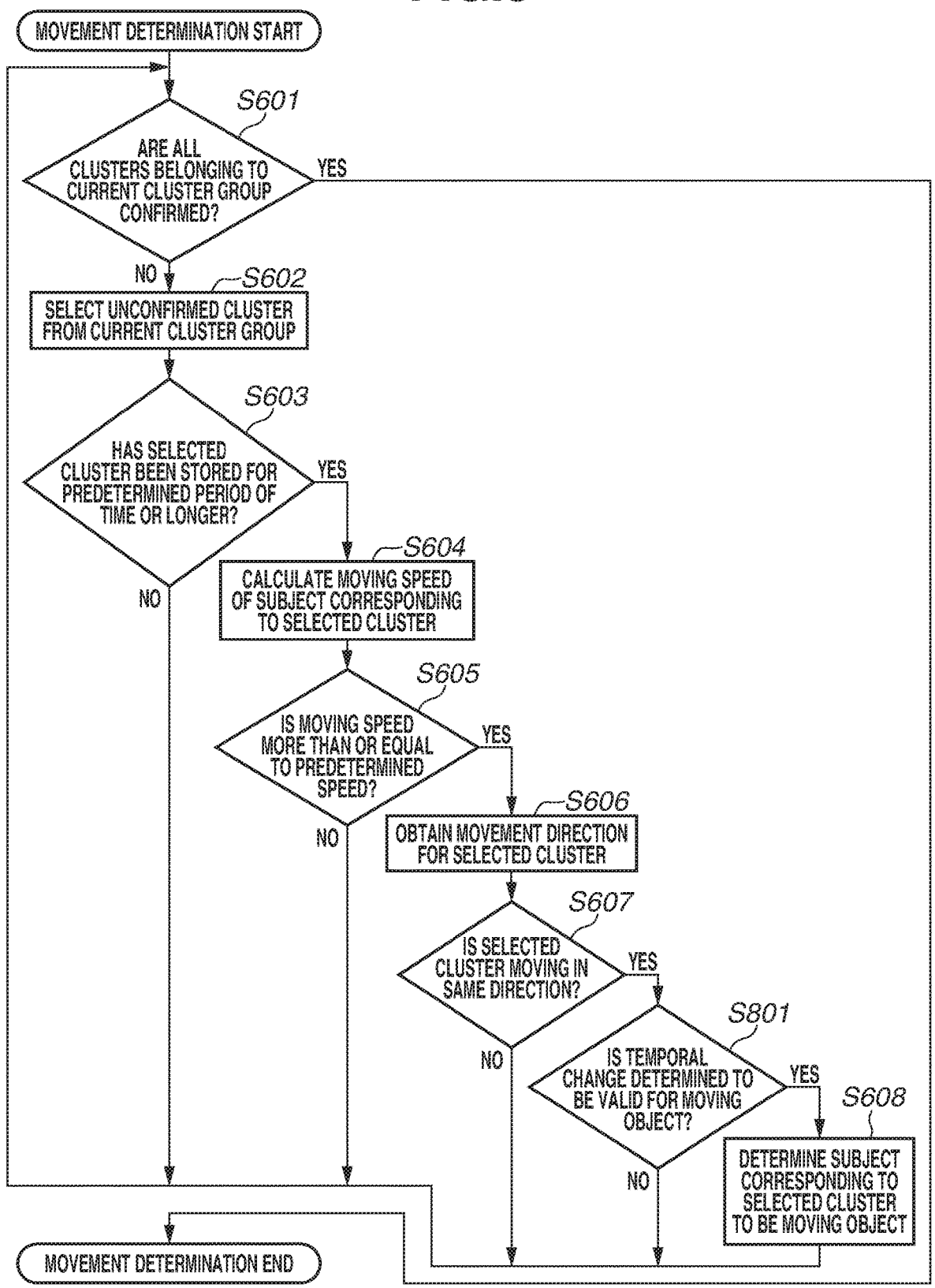
FIG. 8 is a flowchart illustrating movement determination processing according to the second exemplary embodiment.

In step S801 illustrated in FIG. 8, the system control unit 50 determines whether the temporal change is valid for the movement of the object based on the memory of the temporal change in the representative defocus amount. For example, if unrelated clusters are associated with each other in step S701, the temporal change in the representative defocus amount is an unexpectedly significant change, and thus it may be desirably determined that the temporal change is not valid for the movement of the object. In the present exemplary embodiment, the validity is determined based on a determination coefficient by applying the motion of the object to a straight line using a simple regression analysis. A regression model corresponding to the motion of the object is also referred to as a motion model.

Assuming that the stored temporal change in the representative defocus amount is represented by $D=\{d_1, \ldots, d_n\}$ and the time when each representative defocus amount is obtained is represented by $T=\{t_1, \ldots, t_n\}$, a regression model $f(t)=\alpha t+\beta$ can be obtained by the following expressions:

$$\alpha = \frac{\sum_{i=1}^{n}(t_i - \bar{t})(d_i - \bar{d})}{\sum_{i=1}^{n}(t_i - \bar{t})^2}, \text{ and} \quad (1)$$

$$\beta = \bar{d} - \alpha \bar{t} \text{ where } \bar{t}, \quad (2)$$

represents an average value of T, and where
$\bar{d}$
represents an average value of D. In this case, a determination coefficient $R^2$ is obtained by the following expression:

$$R^2 = 1 - \frac{\sum_{i=1}^{n}(d_i - f(t_i))^2}{\sum_{i=1}^{n}(d_i - \bar{d})^2}. \quad (3)$$

If the determination coefficient $R^2$ of the selected cluster is greater than a threshold, the system control unit 50 determines that the cluster is valid as a moving object, and then the processing proceeds to step S608. If the determination coefficient $R^2$ of the selected cluster is less than or equal to the threshold, it is determined that the cluster is not valid as a moving object, and then the processing returns to step S601.

In the present exemplary embodiment, the linear regression model $f(t)=\alpha t+\beta$ is used to determine the validity as a moving object. However, in practice, the regression model to be used is not limited to this example. For example, if a moving object is in linear uniform motion, a temporal change in defocus amount obtained in this case does not follow a linear expression. Accordingly, for example, a multiple regression analysis is performed using a regression model represented by $f(t)=\alpha t^n+\beta t+\gamma$ and the validity is determined by comparing the determination coefficient with a threshold. As a result, the validity can be more accurately determined in such a scene.

As described above, in the present exemplary embodiment, after the cluster generation processing, each cluster is not associated with the previous cluster in a one-to-one correspondence, which makes it possible to accurately detect a moving object even under an environment where AF frames cannot be stably integrated, for example, in a case where an image is captured at a long distance, or images of a large number of subjects are simultaneously captured.

Various modified examples of the exemplary embodiments described above can be implemented.

For example, while the first exemplary embodiment illustrates an example where the processing for integrating AF frames for each object is performed according to the flowchart illustrated in FIG. 3, the present invention is not limited to this example. The present invention can also be carried out by applying not only the above-described method, but also known methods, such as a k-means method, an affinity propagation method, and a Gaussian mixture method. While the above-described exemplary embodiments illustrate an example where the difference between defocus amounts is used for determination in the integration processing, the present invention is not limited to this example. The present invention can also be carried out using feature amounts other than the defocus amount. Examples of the feature amounts include color information, a histograms of oriented gradients (HOG) feature amount, vector information, and a combination thereof.

Various control operations that are executed by the system control unit 50 in the exemplary embodiments described above may be executed by one piece of hardware, or a plurality of pieces of hardware (e.g., a plurality of processors or circuits) may share the processing to thereby control the overall operation of the apparatus.

Further, if a plurality of moving objects is detected in the exemplary embodiments described above, a subject that is more similar to a main subject may be selected and driving of the focus lens may be controlled so that the subject is focused. For example, a subject that is located at the center of the plurality of detected moving objects may be selected as the main subject. Alternatively, a subject that is located at a closest distance may be selected as the main subject.

While the present invention has been described in detail above based on preferred exemplary embodiments of the invention, the present invention is not limited to the specific exemplary embodiments. The present invention can be modified in various ways without departing from the gist of the invention. Further, the exemplary embodiments described above are merely examples of the present invention, and the exemplary embodiments can be combined as appropriate.

While the exemplary embodiments described above illustrate an example where the present invention is applied to a phase difference image capturing apparatus, the present invention is not limited to this example. The present invention is applicable to any image capturing apparatus capable of performing ranging processing at a plurality of positions. Specifically, the present invention is applicable to a PC, a personal digital assistance (PDA), a cellular phone terminal, a portable image viewer, a game console, and the like.

The present invention is also implemented by executing the following processing. That is, software (program) for implementing the functions of the above-described exemplary embodiments is supplied to a system or apparatus via a network or various storage media, and a computer (or a central processing unit (CPU), a micro processing unit (MPU), etc.) of the system or apparatus reads a program code and executes the read program code. In this case, the program and a storage medium storing the program can constitute the present invention.

According to an aspect of the present invention, it is possible to accurately detect a moving object even in a situation where the accuracy of focus detection can deteriorate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments.

This application claims the benefit of Japanese Patent Application No. 2019-074980, filed Apr. 10, 2019, which is hereby incorporated by reference herein in its entirety.

What is claimed is:

1. An image processing apparatus comprising:
at least one processor configured to perform the operations of the following units:
a focus detection unit configured to obtain a focus detection result from each of a plurality of focus detection areas, each focus detection result to be obtained corresponding to a specific time;
a grouping unit configured to generate at least two groups, each group including at least one focus detection area based on a comparison between a plurality of the obtained focus detection results; and
a determination unit configured to determine whether an object is moving in an optical axis direction by comparing a focus detection result corresponding to a first group generated based on a focus detection result corresponding to a first time with a focus detection result corresponding to a second group generated based on a focus detection result corresponding to a second time, the second time being later than the first time,
wherein in a case where a difference between a focus detection result corresponding to a first focus detection area included in the second group and the focus detection result corresponding to the second time in a second focus detection area adjacent to the first focus detection area is less than a first threshold, the grouping unit groups the second focus detection area into the second group, and
wherein in a case where the difference between the focus detection result corresponding to the first focus detection area and the focus detection result corresponding to the second time in the second focus detection area is more than or equal to the first threshold, the grouping unit does not group the second focus detection area into the second group.

2. The image processing apparatus according to claim 1, wherein in a case where a difference between a representative value for the focus detection result in the second group and a representative value for the focus detection result corresponding to the second time in a third group is more than the first threshold and less than a second threshold, the grouping unit groups the third group into the second group.

3. The image processing apparatus according to claim 2, wherein in a case where the difference between the representative value for the focus detection result in the second group and the representative value for the focus detection result corresponding to the second time in the third group is more than or equal to the second threshold, the grouping unit does not group the third group into the second group.

4. The image processing apparatus according to claim 1, wherein in a case where the number of focus detection areas included in a group generated by the grouping unit is less than a threshold, the determination unit does not use the group for determination.

5. The image processing apparatus according to claim 1, wherein the processor configured to further perform the operations of the following units:
an identification unit configured to determine whether a subject corresponding to the first group is identical to a subject corresponding to the second group by comparing the focus detection result corresponding to the first group with the focus detection result corresponding to the second group; and
a storage unit configured to store the focus detection result corresponding to the second group by associating the focus detection result corresponding to the second group with the first group and the focus detection result corresponding to the first group in a case where the identification unit identifies the subject corresponding to the first group and the subject corresponding to the second group to be the same subject.

6. The image processing apparatus according to claim 5, wherein in a case where a difference between the focus detection result corresponding to the first group and the focus detection result corresponding to the second group is less than a third threshold, the identification unit determines that the subject corresponding to the first group and the subject corresponding to the second group are the same subject, and
in a case where the difference between the focus detection result corresponding to the first group and the focus detection result corresponding to the second group is more than or equal to the third threshold, the identification unit determines that the subject corresponding to the first group and the subject corresponding to the second group are different subjects.

7. The image processing apparatus according to claim 5, wherein in a case where a difference between a position of the first group and a position of the second group is less than a fourth threshold, the identification unit determines that the subject corresponding to the first group and the subject corresponding to the second group are the same subject, and wherein in a case where the difference between the position of the first group and the position of the second group is more than or equal to the fourth threshold, the identification unit determines that the subject corresponding to the first group and the subject corresponding to the second group are different subjects.

8. The image processing apparatus according to claim 5,
wherein in a case where a difference between the number of focus detection areas included in the first group and the number of focus detection areas included in the second group is less than a fifth threshold, the identification unit determines that the subject corresponding to the first group and the subject corresponding to the second group are the same subject, and wherein in a case where the difference between the number of focus detection areas included in the first group and the number of focus detection areas included in the second group is more than or equal to the fifth threshold, the identification unit determines that the subject corresponding to the first group and the subject corresponding to the second group are different subjects.

9. The image processing apparatus according to claim 5,
wherein in a condition in which a difference between the focus detection result corresponding to the first group and the focus detection result corresponding to the second group is less than a third threshold, in a condition in which a difference between a position of the first group and a position of the second group is less than a fourth threshold, and in a condition in which a difference between the number of focus detection areas included in the first group and the number of focus detection areas included in the second group is less than a fifth threshold, the identification unit determines that the subject corresponding to the first group and the subject corresponding to the second group are the same subject, and wherein in a case where any one of the conditions is not satisfied, the identification unit determines that the subject corresponding to the first group and the subject corresponding to the second group are different subjects.

10. The image processing apparatus according to claim 5,
wherein the determination unit obtains a plurality of comparison results each indicating whether a change direction in a focus detection result corresponds to one of a first direction and a second direction by comparing focus detection results corresponding to a plurality of groups determined to be the same subject by the identification unit, and wherein in a case where a ratio of results indicating that the change direction in the focus detection result corresponds to the second direction to results indicating that the change direction in the focus detection result corresponds to the first direction is more than or equal to a predetermined ratio, the determination unit determines that the subject is moving in the second direction.

11. The image processing apparatus according to claim 1,
wherein the processor configured to further perform the operation of a storage unit configured to store the focus detection result corresponding to the second group by associating the focus detection result corresponding to the second group with the first group and the focus detection result corresponding to the first group in a case where the identification unit identifies the subject corresponding to the first group and the subject corresponding to the second group to be the same subject, and wherein in a case where the focus detection result corresponding to the first group and the focus detection result corresponding to the second group correspond to a motion model of a moving object, the determination unit determines that the object corresponding to the first group and the second group is moving.

12. A control method of an image processing apparatus, comprising:

obtaining a focus detection result from each of a plurality of focus detection areas, each focus detection result to be obtained corresponding to a specific time;

generating at least two groups, each group including at least one focus detection area based on a comparison between a plurality of obtained focus detection results; and determining whether an object is moving in an optical axis direction by comparing a focus detection result corresponding to a first group generated based on a focus detection result corresponding to a first time with a focus detection result corresponding to a second group generated based on a focus detection result corresponding to a second time, the second time being later than the first time, wherein in a case where a difference between a focus detection result corresponding to a first focus detection area included in the second group and the focus detection result corresponding to the second time in a second focus detection area adjacent to the first focus detection area is less than a first threshold, the generating groups the second focus detection area into the second group, and wherein in a case where the difference between the focus detection result corresponding to the first focus detection area and the focus detection result corresponding to the second time in the second focus detection area is more than or equal to the first threshold, the generating does not group the second focus detection area into the second group.

13. The control method according to claim 12, further comprising grouping the second focus detection area into the second group, in in a case where a difference between a focus detection result corresponding to a first focus detection area included in the second group and the focus detection result corresponding to the second time in a second focus detection area adjacent to the first focus detection area is less than a first threshold.

14. The control method according to claim 12, further comprising:

determining whether a subject corresponding to the first group is identical to a subject corresponding to the second group by comparing the focus detection result corresponding to the first group with the focus detection result corresponding to the second group; and storing the focus detection result corresponding to the second group by associating the focus detection result corresponding to the second group with the first group and the focus detection result corresponding to the first group in a case where the identification unit identifies the subject corresponding to the first group and the subject corresponding to the second group to be the same subject.

15. A non-transitory storage medium storing a program for causing a program to execute a control method of an image processing apparatus, the control method comprising:
obtaining a focus detection result from each of a plurality of focus detection areas, each focus detection result to be obtained corresponding to a specific time;
generating at least two groups, each group including at least one focus detection area based on a comparison between a plurality of obtained focus detection results;
determining whether an object is moving in an optical axis direction by comparing a focus detection result corresponding to a first group generated based on a focus detection result corresponding to a first time with a focus detection result corresponding to a second group generated based on a focus detection result corresponding to a second time, the second time being later than the first time, and
grouping the second focus detection area into the second group, in in a case where a difference between a focus detection result corresponding to a first focus detection area included in the second group and the focus detection result corresponding to the second time in a second focus detection area adjacent to the first focus detection area is less than a first threshold.

16. The non-transitory storage medium according to claim 15, further comprising:
determining whether a subject corresponding to the first group is identical to a subject corresponding to the second group by comparing the focus detection result corresponding to the first group with the focus detection result corresponding to the second group; and
storing the focus detection result corresponding to the second group by associating the focus detection result corresponding to the second group with the first group and the focus detection result corresponding to the first group in a case where the identification unit identifies the subject corresponding to the first group and the subject corresponding to the second group to be the same subject.

17. An image processing apparatus comprising:
at least one processor configured to perform the operations of the following units:
a focus detection unit configured to obtain a focus detection result from each of a plurality of focus detection areas, each focus detection result to be obtained corresponding to a specific time;
a grouping unit configured to generate at least two groups, each group including at least one focus detection area based on a comparison between a plurality of the obtained focus detection results; and
a determination unit configured to determine whether an object is moving in an optical axis direction by comparing a focus detection result corresponding to a first group generated based on a focus detection result corresponding to a first time with a focus detection result corresponding to a second group generated based on a focus detection result corresponding to a second time, the second time being later than the first time,
wherein in a case where the number of focus detection areas included in a group generated by the grouping unit is less than a threshold, the determination unit does not use the group for determination.

18. The image processing apparatus according to claim 17, wherein in a case where a difference between a focus detection result corresponding to a first focus detection area included in the second group and the focus detection result corresponding to the second time in a second focus detection area adjacent to the first focus detection area is less than a first threshold, the grouping unit groups the second focus detection area into the second group.

19. The image processing apparatus according to claim 18, wherein in a case where the difference between the focus detection result corresponding to the first focus detection area and the focus detection result corresponding to the second time in the second focus detection area is more than or equal to the first threshold, the grouping unit does not group the second focus detection area into the second group.

20. The image processing apparatus according to claim 18, wherein in a case where a difference between a representative value for the focus detection result in the second group and a representative value for the focus detection result corresponding to the second time in a third group is more than the first threshold and less than a second threshold, the grouping unit groups the third group into the second group.

21. The image processing apparatus according to claim 20, wherein in a case where the difference between the representative value for the focus detection result in the second group and the representative value for the focus detection result corresponding to the second time in the third group is more than or equal to the second threshold, the grouping unit does not group the third group into the second group.

22. The image processing apparatus according to claim 17, wherein the processor configured to further perform the operations of the following units:
an identification unit configured to determine whether a subject corresponding to the first group is identical to a subject corresponding to the second group by comparing the focus detection result corresponding to the first group with the focus detection result corresponding to the second group; and
a storage unit configured to store the focus detection result corresponding to the second group by associating the focus detection result corresponding to the second group with the first group and the focus detection result corresponding to the first group in a case where the identification unit identifies the subject corresponding to the first group and the subject corresponding to the second group to be the same subject.

23. The image processing apparatus according to claim 17,
wherein the processor configured to further perform the operation of a storage unit configured to store the focus detection result corresponding to the second group by associating the focus detection result corresponding to the second group with the first group and the focus detection result corresponding to the first group in a case where the identification unit identifies the subject corresponding to the first group and the subject corresponding to the second group to be the same subject, and
wherein in a case where the focus detection result corresponding to the first group and the focus detection result corresponding to the second group correspond to a motion model of a moving object, the determination unit determines that the object corresponding to the first group and the second group is moving.

24. A control method of an image processing apparatus, comprising:
obtaining a focus detection result from each of a plurality of focus detection areas, each focus detection result to be obtained corresponding to a specific time;

generating at least two groups, each group including at least one focus detection area based on a comparison between a plurality of obtained focus detection results; and determining whether an object is moving in an optical axis direction by comparing a focus detection result corresponding to a first group generated based on a focus detection result corresponding to a first time with a focus detection result corresponding to a second group generated based on a focus detection result corresponding to a second time, the second time being later than the first time, wherein in a case where the number of focus detection areas included in a group generated by the grouping unit is less than a threshold, the group is not used for determination.

\* \* \* \* \*